United States Patent [19]
Miyazaki

[11] Patent Number: 6,089,589
[45] Date of Patent: Jul. 18, 2000

[54] STEERING APPARATUS

[75] Inventor: Osamu Miyazaki, Kashihara, Japan

[73] Assignee: Koyo Seiko Co., Ltd., Osaka, Japan

[21] Appl. No.: 08/871,450

[22] Filed: Jun. 9, 1997

[30] Foreign Application Priority Data

Jun. 14, 1996 [JP] Japan ................................. 8-154641

[51] Int. Cl.⁷ ............................................. F16H 27/02
[52] U.S. Cl. ................................. 280/428; 74/89.11
[58] Field of Search ..................... 180/400, 428; 280/93, 514, 515; 74/89.11, 422; 188/328.11; 267/179, 170

[56] References Cited

U.S. PATENT DOCUMENTS

| | | | |
|---|---|---|---|
| 3,693,999 | 9/1972 | Wood, Jr. ................................. | 280/93 |
| 3,788,159 | 1/1974 | Plant, II ................................. | 74/422 |
| 3,810,399 | 5/1974 | Schluckebier et al. ................. | 74/422 |
| 4,063,834 | 12/1977 | Hansen et al. ........................... | 280/93 |
| 4,127,186 | 11/1978 | Koyano et al. ......................... | 180/400 |
| 4,142,448 | 3/1979 | Erwin ...................................... | 180/400 |
| 4,282,770 | 8/1981 | Adams .................................... | 74/422 |
| 4,672,713 | 6/1987 | Newton et al. ......................... | 16/197 |
| 4,709,591 | 12/1987 | Emori et al. ............................ | 74/422 |
| 5,189,923 | 3/1993 | Lashbrook ............................ | 74/89.11 |
| 5,330,023 | 7/1994 | Miyashita et al. ..................... | 180/400 |
| 5,456,330 | 10/1995 | Kojima et al. ......................... | 180/79.1 |
| 5,655,620 | 8/1997 | Joerg et al. ............................. | 180/428 |
| 5,788,009 | 8/1998 | Lee ......................................... | 180/428 |

FOREIGN PATENT DOCUMENTS 57-159577  10/1982  Japan .

Primary Examiner—Kevin Hurley
Assistant Examiner—Andrew J. Fischer
Attorney, Agent, or Firm—Darby & Darby

[57] ABSTRACT

A steering apparatus in which an elastic member is held to a limited part of a rack shaft at the side fitting a joint member to limit a scratched area on periphery of the rack shaft to a specified area, such that sealing effects to a hydraulic cylinder for steering-assist is not impaired and also a rack tooth is avoided from being damaged.

2 Claims, 6 Drawing Sheets

STEERING APPARATUS

BACKGROUND OF THE INVENTION

The present invention relates to a steering apparatus of rack and pinion type more particularly, to a structure for applying a restoring force required for restoration from a turning state to a straight-ahead state to a rack shaft slidable in a direction of its axial length for steering.

Known as one type of an automobile steering system is a rack and pinion steering system which comprises a rack shaft extending laterally of a car body and connected with right and left operating wheels (usually front wheels) at the opposite ends and a pinion meshed with the rack shaft at an intermediate portion thereof and connected with a steering wheel so as to be associated in operation therewith.

The rack shaft is supported in a cylindrical housing extending laterally of the car body so as to be slidable in a direction of its axial length and is linked with the right and left operating wheels through respective link members (tie rods) at the opposite ends projecting toward both sides of the housing, so as to be slid in response to rotation of the pinion resulting from the control of the steering wheel. The sliding motion of the rack shaft is transferred to the right and left operating wheels to change direction of the operating wheels. The tie rods are connected with the ends of the rack shaft via joint means such as ball joints, to transfer power between the ends which move linearly along its axis with the sliding motion of the rack shaft and the operating wheels which turn at an uniaxially swinging motion.

In general, an automobile steering system comprises means for allowing the operating wheels changed in direction by control of the steering wheel to be restored to the straight-ahead state by the action of a reaction force from a road surface. The means allows the operating wheels to be restored from the turning state to the straight-ahead state when a driver lets go of the steering wheel during a car being in motion. This restoration of the operating wheels can be well realized by components of a steering mechanism including the steering wheel being arranged in proper alignment with each other as viewed in plan. However, in a front portion of a vehicle in which the components of the steering mechanism is arranged, components of a drive mechanism including an engine, a transmission and others are also arranged in general, which makes it difficult to realize the proper alignment of the components of the steering mechanism.

On the other hand, many automobiles in recent years are equipped with a power steering system to save labor required for the control of the steering wheel for steering so as to afford a driver a pleasant steering feeling. The power steering system is so structured that a steering-assist actuator arranged in the steering mechanism assists the steering with the power generated in according to the control of the steering wheel. The power steering system can be roughly divided into the hydraulic type using a hydraulic actuator as the steering-assist actuator and the electric power type using an electric motor as the steering-assist actuator.

In a case where the hydraulic power steering system is combined with the rack and pinion type steering wheel system, a piston fixedly mounted on the rack shaft is arranged in a cylinder chamber which is formed by an intermediate portion of the housing of the rack shaft being sealed in liquid tight, thereby constituting the steering-assist hydraulic cylinder. However, in this arrangement, sealing members for sealing the cylinder chamber in liquid tight are in elastic contact with the periphery of the rack shaft at the both ends thereof and act as resistance to the sliding motion of the rack shaft, thus disadvantageously hindering the above-mentioned restoration of the operating wheels to the straight-ahead state resulting from the sliding motion of the rack shaft.

To avoid these disadvantages, various arrangements using an elastic body such as a spring to assist the restoration of the operating wheels to the straight-ahead state have been proposed. It is rational that the resilient force to assist the restoration is applied directly to a member which hinders the restoration, and the rack and pinion type steering system commonly adopts an arrangement in which the resilient force is applied to the rack shaft, as disclosed by Japanese Utility Model Application Laid-Open No. 57-159577 (1982) and others.

FIG. 1 shows an example of such a conventional type steering system, which is so arranged that a coiled spring B is fitted in an opening 20 of a cylindrical housing 2 containing a rack shaft 1 on each side (only one side thereof is shown). With this arrangement, when the rack shaft 1 is slid in the direction indicated by a white arrow in FIG. 1, a part of the rack shaft 1 sliding into the housing 2, or rather an end face of the ball joint 5 for use in jointing with a tie rod 4, comes into elastic contact with the other end of the coiled spring B through a washer B' and contracts the coiled spring. When the control of the steering wheel is released in this state, the rack shaft 1 is pressed in the reverse direction by the spring force of the coiled spring B to assist the restoration to the straight-ahead state.

However, with this conventional type arrangement, since the coiled spring B built in the opening 20 of the housing 2 is so disposed as to encircle the rack shaft 1, and the rack shaft 1 moves inside of the coiled spring B to the nearly whole extent of its sliding in both rightward and leftward directions resulting from the steering, the rack shaft 1, when slid, cannot avoid contacting with the coiled spring B. As a result of this, scratches resulting from the contact with the coiled spring B may develop extensively on the outer periphery of the rack shaft 1.

In the arrangement in which a steering-assist hydraulic cylinder S is provided in the housing 2 to build a hydraulic power steering system, as shown in FIG. 1, this scratched 4 rack shaft 1 comes into contact with a seal member 6 for sealing the hydraulic cylinder S at the one side thereof, to cause disadvantage that the seal member 6 is damaged and the sealing effect is impaired.

Also, that may cause an additional disadvantage that at the opposite side of the housing 2 shown in FIG. 1, a rack tooth which is formed on the rack shaft 1 to be meshed with a pinion rotatable in according to the control of the steering wheel is damaged to cause impairment in engagement between the rack tooth and the pinion to hinder the smooth sliding of the rack shaft 1 and affect the smooth steering.

BRIEF SUMMARY OF THE INVENTION

To solve the disadvantages mentioned above, this invention has been made. The object of the invention is to provide a steering apparatus including a modified assist means for assisting restoration to the straight-ahead state, the modified assist means being so designed as to enable the area of scratches developing on the outer periphery of the rack shaft to be limited to a specified area, so as not to impair sealing effect for a steering-assist hydraulic cylinder and cause a damage of a rack tooth.

A steering apparatus according to the invention comprises a cylindrical housing; a rack shaft being supported in the housing to be slidable in a direction of its axial length and whose ends of projecting toward both sides of the housing are respectively connected with tie rods extending to right and left operating wheels via respective joint members so that the operating wheels turn with a sliding motion of the rack shaft according to control of a steering wheel; and an elastic member, on at least one side of the rack shaft closer to the joint members, for being held on the periphery of the rack shaft with one end of the elastic member contacting with an end face of the joint member, so that, when the rack shaft is slid, the elastic member is contracted with the other end of the elastic member brought into elastic contact with a part of the housing at the side of the rack shaft entering the housing, to apply to the rack shaft an elastic force acting in the opposite direction to the entering direction of the rack shaft.

With this constructed steering apparatus, when the rack shaft is slid in according to the control of the steering wheel, with the elastic member fitted onto and held to the periphery of the rack shaft joined to the joint member for connecting the rack shaft with the tie rod, the elastic member is pressed and contracted between an end face of the housing on the side of the rack shaft entering the housing and the end face of the joint member, so as to be brought at into a situation in which an elastic force acting in the direction opposite to the sliding direction of the rack shaft is applied to the elastic member. When the control of the steering wheel is released in this state, the rack shaft is pushed by the effect of the elastic force, to assist the rack shaft in sliding in the reverse direction or in restoring to the straight-ahead state. During these operations, only a limited area of the rack shaft close to the area in which the elastic member is held is in the inside of the elastic member. Therefore, the scratches resulting from the contact with the elastic member merely develop within this limited area but do not extend so far as a sealing area in the housing in which the hydraulic cylinder for steering-assist is sealed and a rack-tooth forming area of the rack shaft.

Preferably, in the steering apparatus according to the invention, the rack shaft includes a holding part placed at the side thereof fitting the joint member to which the elastic member is to be held and having a diameter smaller than the other parts of the rack shaft, and the elastic member is a coiled spring which is fitted on the periphery of the holding part of the rack shaft and is held between a step part provided in the boundary of the holding part and the other parts of the rack shaft and the end face of the joint member, with pressurized at a predetermined pressure.

With this constructed steering system, since the coiled spring used as an elastic member is held to the holding part placed at the side of the rack shaft fitting thereon the joint member and having a diameter smaller than the other parts, with pressurized at a predetermined pressure between the step part between the holding part and the other parts and the joint member, the coiled spring is prevented from being rattled on the holding part when the coiled spring is in a situation of being not contracted by the contact with the end face of the housing.

Further, in the steering apparatus according to the invention, it is desirable that the rack shaft includes an engagement part having a smaller diameter than the holding part, at a part thereof close to the end of the rack shaft fitting the joint member to which the elastic member is to be held, and the coiled spring has, at an end thereof close to the joint member, a seating part having a smaller coil diameter than the other parts, the seating part being fixedly fitted in the engagement part.

This constructed steering system, in which the coiled spring has at one end thereof the seating part having a smaller coil diameter than the other parts of the same, and the rack shaft has the engagement part having a smaller diameter than the holding part, at a part close to the end of the rack shaft fitting thereon the joint member, with the seating part of the coiled spring fixedly fitted in the engagement part, can provide the advantage that the fitting of the coiled spring onto the rack shaft can be separately done in advance of the fitting of the joint member on the rack shaft, to facilitate the assembly.

Further, in the steering apparatus according to the invention, it is advantageous that the coiled spring further comprises a cushioning body interposed between the step part of the rack shaft and a part of the coiled spring to be contacted with the step part.

With this constructed steering wheel, the cushioning body using a cap ring for example acts to absorb the shock of a collision between the step part and the coiled spring and provides the cushioning effect, whether the control of the steering wheel is carried out or released, in other words, when the rack shaft is slid in either direction. In addition, since the cushioning body serves to keep a clearance between the periphery of the holding part and the coiled spring to prevent a direct contact of the both, thus restraining development of the scratches at the holding part.

The above and further objects and features of the invention will more fully be apparent from the following detailed description with accompanying drawings.

DETAILED DESCRIPTION OF THE INVENTION

Figure 1:
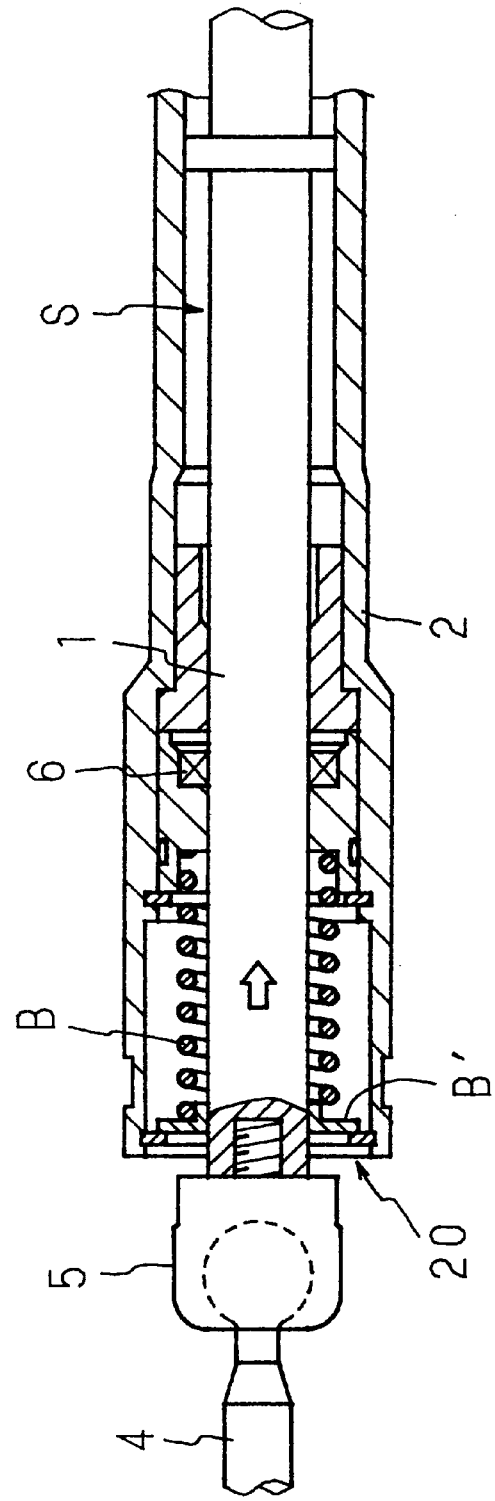
FIG. 1 is a front sectional view showing a main part of a conventional type rack and pinion type steering apparatus including a restoration-to-straight-ahead-state means.
Figure 2:
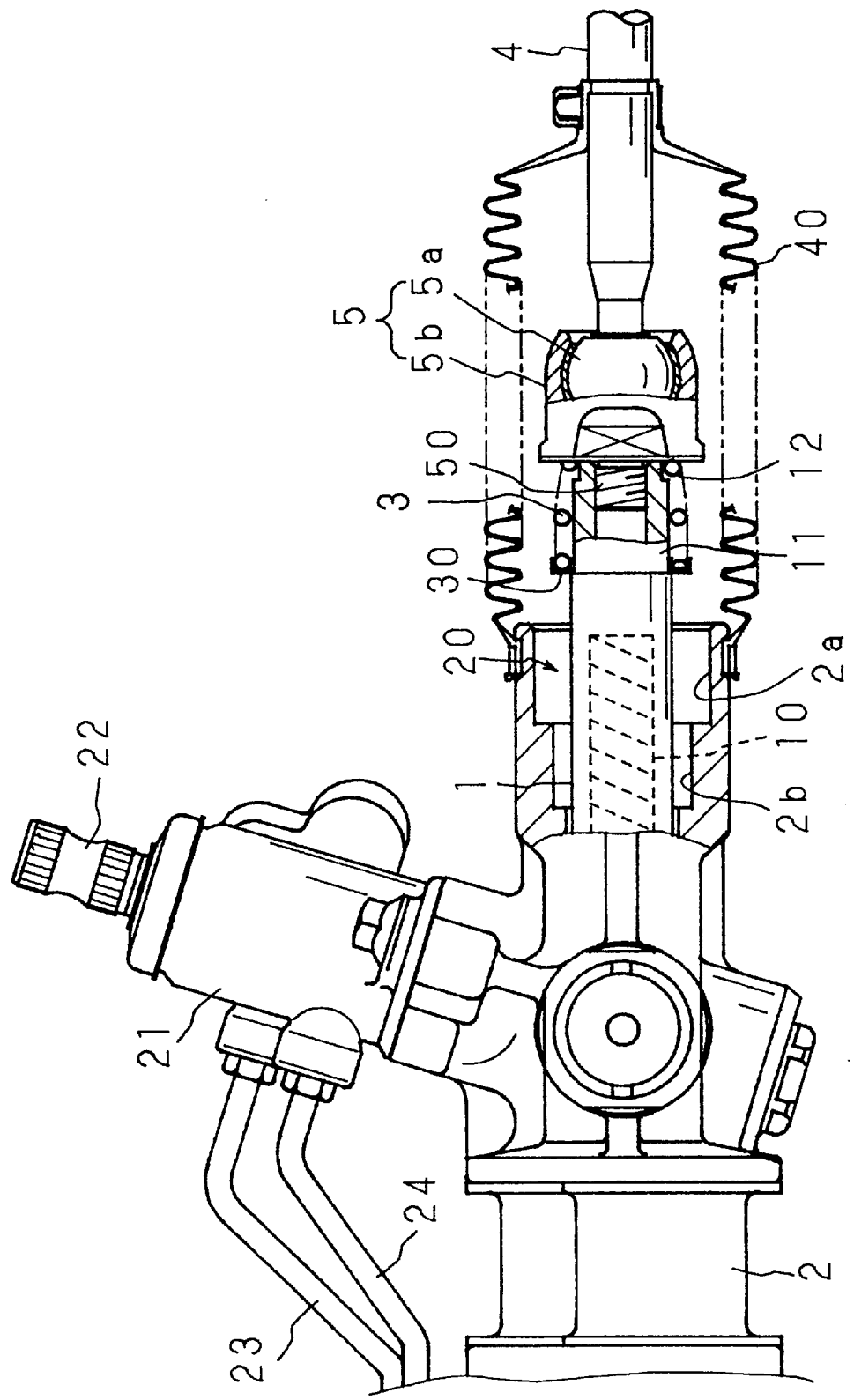
FIG. 2 is a partly cutaway front view showing a main part of the rack and pinion type steering apparatus according to the invention.
Figure 3:
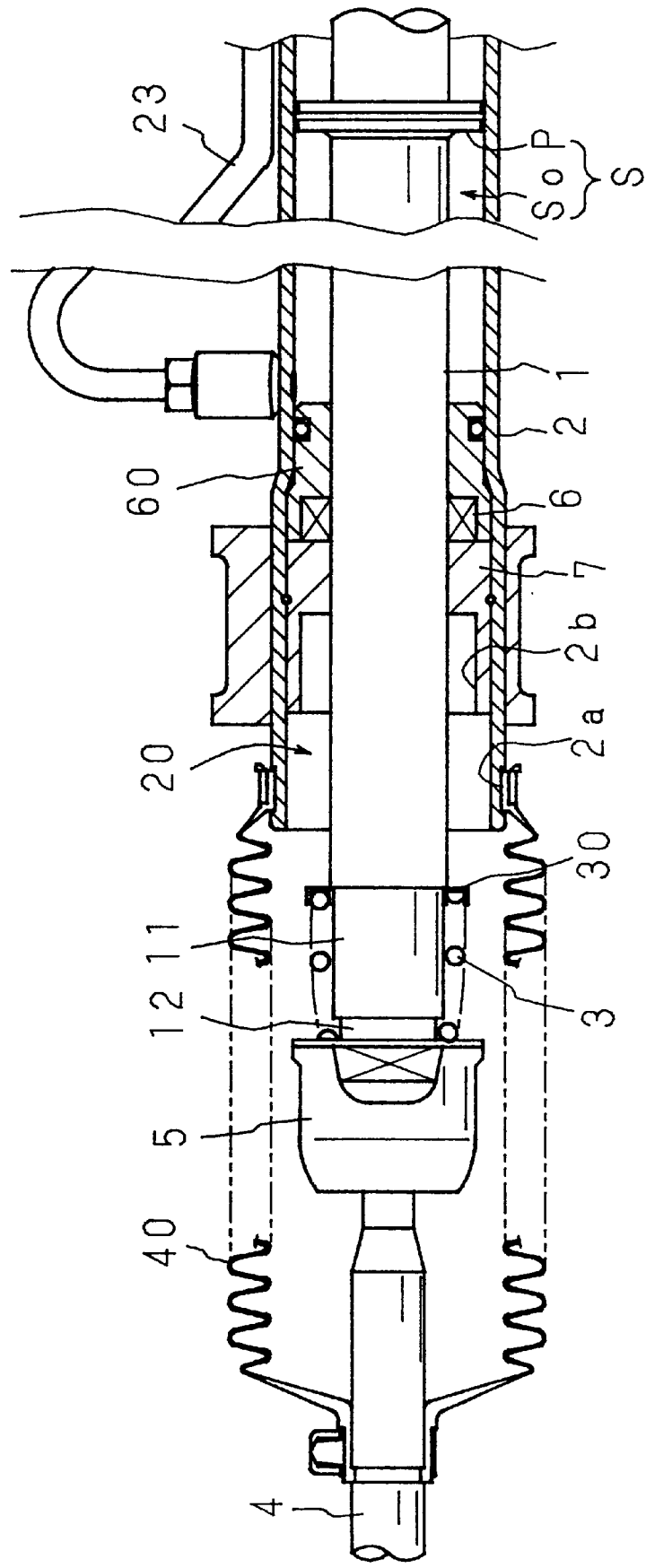
FIG. 3 is a front sectional view showing another main part of the rack and pinion type steering apparatus according to the invention.

Referring now to the accompanying drawing figures, an example of the preferred embodiment of the invention is described below. FIG. 2 is a partly cutaway front view showing a main part of the steering apparatus of rack and pinion type according to the invention, and FIG. 3 is a front sectional view showing another main part of the same.

A steering system according to the invention comprises a rack shaft 1 which is so supported in a cylindrical housing 2 as to be slidable in a direction of its axial length. The rack shaft 1 is associated with right and left operating wheels not shown through respective tie rods 4, 4 at the opposite ends projecting from openings 20, 20 at both sides of the housing 2 (the right side and the left side of the same are illustrated in FIGS. 2 and 3, respectively).

The rack shaft 1 has a rack tooth 10 formed in an area close to the one end portion thereof to extend over a proper length, as depicted in a broken line in FIG. 2. The rack tooth 10 is meshed with a pinion (not shown) integrally formed with a pinion shaft 22 rotatably supported in the inside of a pinion housing 21 intersecting the housing 2 at an intermediate part thereof. The pinion shaft 22 is connected with a steering wheel not shown at its upper end projecting above the housing 21 so that it can be rotated in accordance with the control of the steering wheel. The rotation of the pinion shaft 22 is converted into a sliding motion of the rack shaft 1 via the pinion and the rack tooth 10 meshed with each other, and the sliding motion is transferred to the right and left operating wheels through the tie rods 4, 4 to steer a vehicle.

In the inside of the pinion housing 21, an oil pressure control valve is built to control the supply and discharge of oil pressure in accordance with steering torque applied to the pinion shaft 22 according to the control of the steering wheel. The oil fed from the oil pressure control valve is fed to a steering-assist hydraulic cylinder S formed at the other side of the housing 2 via a pair of feed tubes 23, 24 connected with the pinion housing 21 at the outside thereof. This forms a power steering apparatus for assisting the steering which is effected with the sliding motion of the rack shaft 1, as mentioned above.

Shown in FIG. 3 is a portion of the housing 2 close to an end thereof at the opposite side to that shown in FIG. 2. As partly shown in FIG. 3, the hydraulic cylinder S is defined in the housing 2 in which a pair of seal rings 60, 60, each retaining therein a seal member (an oil seal) 6 contactable with the outer periphery of the rack shaft 1, are fitted (only one side of the same is shown). The interior of the housing 2 is partitioned at a proper interval to form liquid-tight sealed, cylinder chambers, in which a piston P fixedly fitted to the rack shaft 1 at an intermediate portion thereof is slidably inserted. The feed tubes 23, 24 (only one feed tube 23 is shown in FIG. 3) are respectively connected with both ends of the cylinder chambers which are separated from each other at the opposite sides of the piston P, to introduce the oil fed from the oil pressure control valve therein.

Ball joints 5, 5 are used for connecting the ends of the rack shaft 1 with the tie rods 4, 4. The ball joints 5 are known one, each comprising a ball 5a fitted in continuity with the basal end of the tie rod 4 to be integral therewith and a housing 5b coaxially screwed with and fixed to the end portion of the rack shaft 1 and supporting the ball 5a in a holding manner, as shown in partly cutaway in FIG. 2. The ball joints allow the tie rods 4 to be slanted in any directions with respect to the rack shaft 1 by the sliding of the ball 5a in the housing 5b, so as to enable the rack shaft 1 and the operating wheels to be so connected via the tie rods 4 as to absorb the difference in the moving track therebetween. The connected parts are covered with bellows 40 whose opposite ends are fitted to the periphery of the opening 20 of the housing 2 and the periphery of the tie rod 4 on the basal end side, respectively, so as to be protected against foreign matter such as dust, drop of water and the like.

The rack shaft 1 has holding parts 11 made smaller in diameter than the other parts, at the sides fitting the ball joints 5 as joint members, and the coiled springs 3 which is a characteristic feature of the invention are fitted onto the periphery of the holding parts 11. Further, the rack shaft 1 has engagement parts 12 made even smaller in diameter than the holding parts 11, at parts thereof close to the ends on the fitting sides of the ball joints 5, and one end of the each coiled spring 3 is engaged with the related engagement part 12. Also, the one end of the coiled spring 3 is elastically contacted with an end face of the housing 5b of the joint member 5 and the other end portion of the same is elastically contacted with an end face of a step part of the rack shaft 1 defining a boundary between the holding part 11 and the other parts. Thus, the coiled spring 3 is fitted between the both end faces with pressurized at a predetermined pressure.

Figure 4:
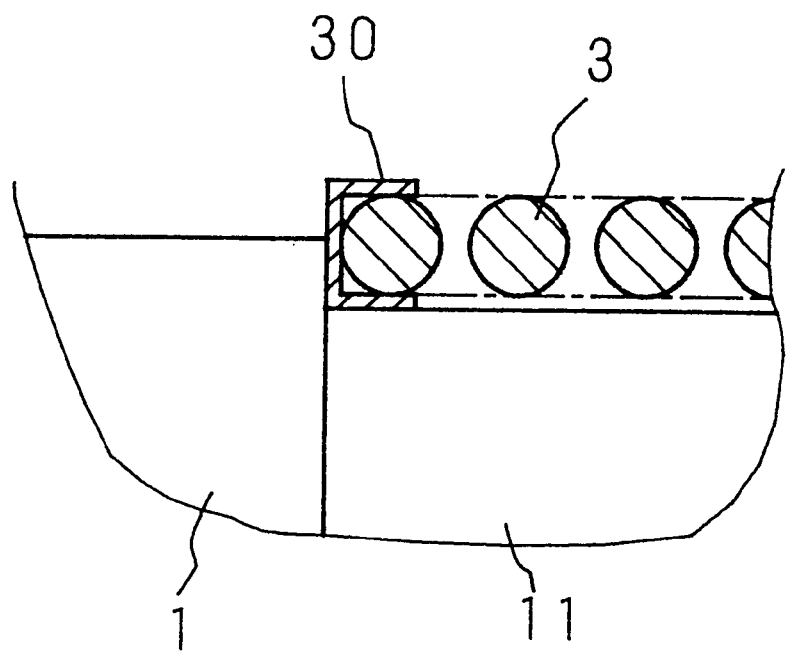
FIG. 4 is an enlarged sectional view of a part of a coiled spring contacted with a step part of the rack shaft.

FIG. 4 is an enlarged sectional view of a part of the coiled spring 3 contacted with the step part of the rack shaft. A thin-wall cap ring 30 is fitted onto the end portion of the coiled spring 3 on the same side so that the coiled spring 3 can be contacted with the step part via the cap ring 30. As illustrated, the cap ring 30 has a bracket-shaped section having an opening at the side opposite to the coiled spring 3. Half a bottom of the cap ring 30 at the inside thereof is contacted with the step part so as to act as a cushion to absorb the shock of a collision between the step part and the coiled spring 3. Also, one side wall of the cap ring 30 acts to keep a clearance between the periphery of the holding part 11 and the coiled spring 3 to prevent a direct contact of the both. Preferably, the cap ring 30 is made of synthetic resin in order that the shock resulting from a collision can be effectively absorbed and also the sliding motion of the coiled spring 3 over the outer periphery of the holding part 11 resulting from the contract of the coiled spring 3 can be made smooth.

Figure 5A:
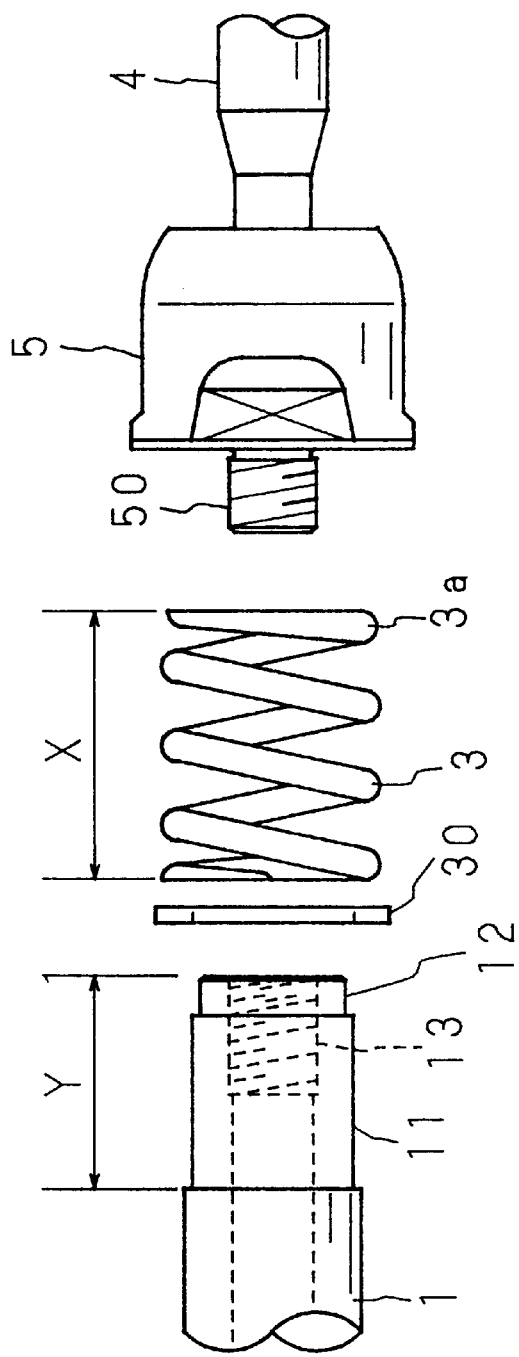
FIGS. 5A, 5B are illustration of the steps of the fitting of the coiled spring.
Figure 5B:
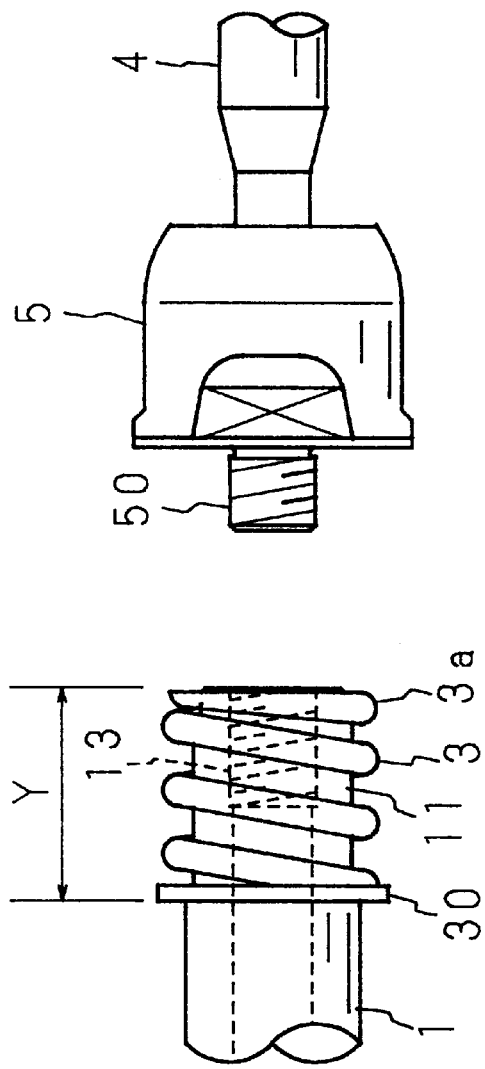

FIGS. 5A, 5B are illustration of the order of the fitting of the coiled spring 3. The rack shaft 1 is provided at its end portions with the holding parts 11 made smaller in diameter than the other parts and at its portions on the tip sides of the holding parts 11 with the engagement parts 12 made even smaller in diameter than the holding parts 11, as described above. As shown in these figures, the coiled spring 3 has a coil of seating part 3a having a smaller coil diameter than the other parts at the side opposite to the side fitting the cap ring 30. Natural length X of the coiled spring 3 is set to be larger than length Y of the holding part 11 and engagement part 12 of the rack shaft 1, and an inner diameter of the seating part 3a of the coiled spring 3 is set to be slightly smaller than an outer diameter of the engagement part 12. Also, an outer diameter of the holding part 11 is set to be slightly smaller than an inner diameter of the cap ring 30 fitted to the other end of the coiled spring 3.

After having been coaxially positioned with respect to the end portion of the rack shaft 1, as shown in FIG. 5A, the coiled spring 3 is pushed, and the cap ring 30 is inserted onto the end of the rack shaft 1, with its fitting side at the head, while it is being loose-fitted to the holding part 12. After the cap ring 30 is pressed to the step part at the basal end of the holding part 11, the coiled spring 30 continues being pushed from the side of the seating part 3a until the seating part 3a is pressed into the engagement part 12. In this way, the coiled spring 3 is fitted in place, as shown in FIG. 5B. In this state, the coiled spring 3 is restrainted between the cap ring 30 pressed to the step part and the seating part 3a pressed into the engagement part 12, with the natural length X reduced to the length Y. Thereafter, the coiled spring 3 is held, with pressurized, between the cap ring 30 at the step part and the end face of the ball joint 5 fixedly screwed into the end portion of the rack shaft 1.

The fixture of the ball joint 5 to the rack shaft 1 can be easily carried out by screwing an external thread portion 50 coaxially projecting from the housing 5b into an internal thread bore 13 in the end face of the rack shaft 1 at the shaft center part thereof, after the coiled spring 3 is put under restraint, as shown in FIG. 5B. Further, since the coiled spring 3 after fixed is in a pressurized condition between the step part at an intermediate part of the rack shaft 1 and the end face of the ball joint 5 and also is kept from the periphery of the holding part 11, with keeping some clearance, by the cap ring 30 interposed between the contacted part of the coiled spring 3 and the step part, the coiled spring 3 can be prevented from rattling which results from vibration generated from a moving vehicle, to restrain occurrence of noises resulting from collision of components.

Figure 6A:
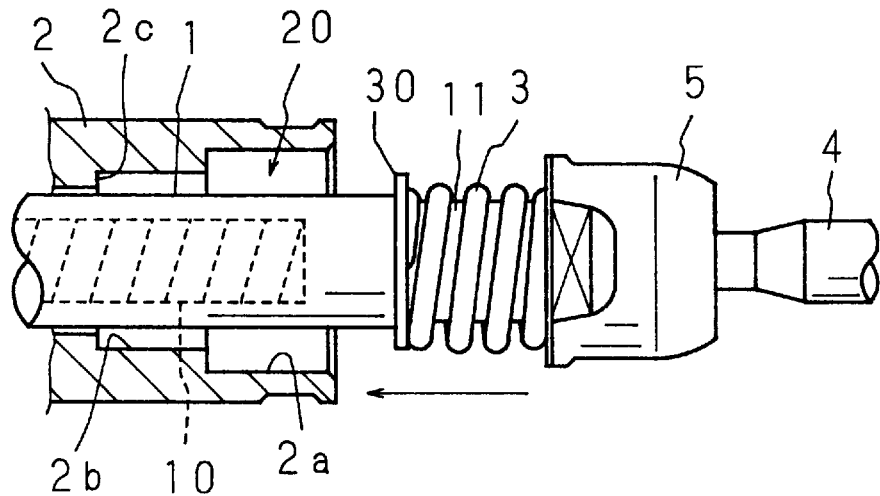
FIGS. 6A, 6B are illustration of the operation of the steering apparatus according to the invention.
Figure 6B:
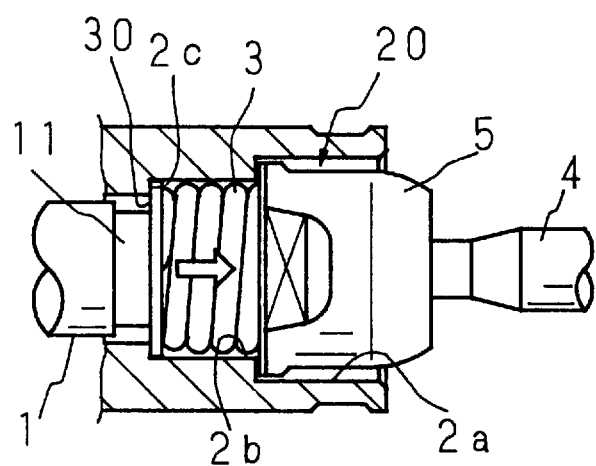

FIGS. 6A, 6B are illustration of the operation of the steering apparatus according to the invention. The representation of the bellows 40 for covering the opening 20 is omitted from the illustration of these figures.

As shown in FIGS. 6A, 6B and FIG. 2, in the opening 20 of the housing 2 into which the rack shaft 1 is projected, a large-diameter recess 2a for the ball joint 5 to be inserted in and a small-diameter recess 2b for the coiled spring 3 to be inserted in are formed. In FIG. 6A illustrating the straight-ahead state, the end of the ball joint 5 fitted to the rack shaft 1 is kept away from the end of the housing 2 and the coiled spring 3 keeps its fitted condition as mentioned above.

When the control of the steering wheel is done, the rack shaft 1 is slid along the direction of its axial length, as aforementioned. In one end portion of the housing 2, the sliding motion is in the direction for the rack shaft 1 to be slid into the housing 2, as indicated by an arrow in FIG. 6A, while in the other end portion of the housing 2, the sliding motion is in the direction for the rack shaft 1 to be projected further from the housing 2. The rack shaft 1 is permitted to be slid into the housing 2 to the extent that the ball joint 5 is slipped into the interior of the recess 2a. With this sliding motion of the rack shaft 1, the coiled spring 3 is slid into the recess 2b located at the inward side of the recess 2a, and the cap ring 30 fitted to the tip of the coiled spring 3 is elastically contacted with a bottom 2c of the recess 2b which acts as a contact surface for the spring. Thereafter, with a further sliding motion of the rack shaft 1, the coiled spring 3 is contracted, as shown in FIG. 6B, and presses the rack shaft 1 in the direction opposite to the sliding direction of the rack shaft 1, as indicated by a white arrow in FIG. 6B.

When the control of the steering wheel is released in this situation, the rack shaft 1 is pressed in the direction opposite to the sliding direction, in other words, in the direction that restores to the straight-ahead state, by the spring force of the coiled spring 3 and thereby the restoration is assisted. It is noted that the cap ring 30 at the tip of the coiled spring 3 acts as a cushioning member when it is in elastic contact with the bottom of the recess 2b as well.

While FIGS. 6A, 6B illustrate the operation of the related part on the side shown in FIG. 2, the same operation is done on the opposite side or on the side shown in FIG. 3 also and the restoration to the straight-ahead state is assisted by the contract of the coiled spring 3. For the housing 2 on the side shown in FIG. 3 is used a pipe which is circular in cross section so as to form the cylinder chamber in the hydraulic cylinder S. An internal surface of the opening 20 on the same side is used as the recess 2a for receiving the ball joint 5. Also, a stopper ring 7 is fixedly fitted into a portion of the housing 2 at the side nearer to the opening 20 than to the seal ring 60, and a recess 2b for receiving the coiled spring 3 is formed in the stopper ring 7 at the shaft center part thereof.

As apparent from the foregoing, with the steering apparatus according to the invention, the coiled spring 3 fixedly fitted onto the end portion of rack shaft 1 is contracted in response to the sliding motion of the rack shaft 1 resulting from the turning of the steering wheel, to produce the spring force (elastic force) corresponding to the contraction and act to assist the restoration of the rack shaft 1. During this motion, the end portion of the rack shaft 1 of a limited length, specifically the holding part 11, is merely placed in the inside of the coiled spring 3, so that the scratches resulting from the contact with the coiled spring 3 are made only within this limited area of the rack shaft 1.

Further, the holding part 11 is slid into the inside of the housing 2 to only a slight extent even when the coiled spring 3 is contracted most, as shown in FIG. 6B. Thus, as shown in FIG. 3, the seal member 6 for sealing the steering-assist hydraulic cylinder S at the one side in proximity of the opening 20 at the one side of the housing 2 can be avoided from being damaged by its contacting with the scratched part of the rack shaft 1 which is in sliding motion, thus providing no fear of the sealing effect being impaired by it. Similarly, on the side shown in FIG. 2 as well, the scratches are merely made within the holding part 11 and do not range over an area of the rack shaft 1 in which the rack tooth 10 is formed. Thus, the engagement of the rack tooth 10 with the pinion can be kept well.

Further, in the embodiment described above, since the cap ring 30 made of synthetic resin and fitted to the tip side of the coiled spring 3 serves to keep a clearance between the coiled spring 3 and the holding part 11 to prevent a direct contact of the both, thus restraining occurrence of the scratches at the holding part 11.

Instead of the coiled spring 3, which is used as an elastic member for assisting the restoration to the straight-ahead state in the above embodiment, other proper springs or elastic members such as rubbers may be used.

As mentioned above, since the steering apparatus according to the invention is so structured that when the rack shaft is slid, the elastic member fitted onto and held to the end portion of the rack shaft joined to the joint member is pressed and contracted between the housing and the end face of the joint member, to apply the elastic force acting in the opposite direction to the sliding direction of the rack shaft to the elastic member, only a limited part of the rack shaft close to the area in which the elastic member is held is in the inside of the elastic member. Therefore, the scratches resulting from the contact with the elastic member merely develop within the limited part but do not extend so far as the sealing area in which the steering-assist hydraulic cylinder is sealed in the housing and the area in which rack tooth is formed on the rack shaft. Therefore, the sealing effect to the hydraulic cylinder is not impaired and also there is no fear of the rack tooth being damaged.

Further, since the coiled spring used as the elastic member for assisting the restoration is fitted onto the holding part having a small diameter and located in proximity to the end of the rack shaft and is held between the step part of the holding part at one side thereof and the end face of the joint member, with pressurized at a specified pressure, the coiled spring is prevented from being rattled in its non-operation state as well. Furthermore, since the rack shaft is provided, at a part thereof fitting the joint member, with the engagement part having a smaller diameter than the holding part and the coiled spring is provided with the seating part having a smaller coil diameter which is fixedly fitted into the engagement part, with the seating part of the coiled spring fitted in and fixed to the engagement part, the fitting of the coiled spring can be done separately, to facilitate the assembly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

I claim:

1. In a steering system for a vehicle including a steering wheel used by an operator to control left and right operating wheels, said steering system including a shaft is mounted within a cylindrical housing for sliding movement along its length, the ends of the shaft extending from the housing and being connected to right and left joint members and tie rods providing coupling to the operating wheels, so that sliding movement of the shaft produced by coupling to the steering wheel causes the operating wheels to turn, the improvement comprising:

a contact surface provided inside said housing at a distance from one it of said joint members, an elastic member, having first and second ends, and being mounted on said shaft with its first end retained proximate said one of said joint members, the second end thereof being further from said one of said joint members than the first end and coming into resilient contact with said contact surface when said shaft slides so that said one joint member moves towards said housing, the elastic member producing a force urging said shaft to slide so that said one joint member moves away from said housing, said shaft including a holding part proximate said one joint member which has a diameter smaller than said shaft, said elastic member being a coiled spring which is fitted on the periphery of said holding part of said shaft, the end of the holding part remote from said joint member defining a peripheral step part in said holding part, the spring being retained between the step part and said one joint member, at a predetermined pressure, said shaft including an engagement part having a smaller diameter than said holding part close to the first end of said shaft, and said coiled spring having, at the first end thereof, a seating part having a smaller coil diameter than the coiled spring, said seating part being fixedly fitted in said engagement part.

2. The steering system according to claim 1, further comprising a cushioning body interposed between said step part of said shaft and a part of said coiled spring to be contacted with said step part.

* * * * *

UNITED STATES PATENT AND TRADEMARK OFFICE
CERTIFICATE OF CORRECTION

PATENT NO. : 6,089,589
DATED : July 18, 2000
INVENTOR(S) : Osamu Miyazaki

It is certified that error appears in the above-identified patent and that said Letters Patent is hereby corrected as shown below:

<u>Title page,</u>
Item [73], Assignee, add: -- Isuzu Motors Limited, Tokyo, Japan --

Signed and Sealed this

Fifteenth Day of October, 2002

Attest:

Attesting Officer

JAMES E. ROGAN
*Director of the United States Patent and Trademark Office*